United States Patent [19]

Nishiyama

[11] Patent Number: 5,802,455
[45] Date of Patent: Sep. 1, 1998

[54] SELECTIVE CALL RECEIVER USING TYPEFACE-BASED SOURCE IDENTIFICATION

[75] Inventor: Toshiro Nishiyama, Shizuoka, Japan

[73] Assignee: NEC Corporation, Tokyo, Japan

[21] Appl. No.: 764,882

[22] Filed: Dec. 16, 1996

[30] Foreign Application Priority Data

Dec. 19, 1995 [JP] Japan ................... 7-330165

[51] Int. Cl.⁶ ................................. H04B 7/00
[52] U.S. Cl. .................... 455/38.4; 455/38.1; 455/145; 340/825.44
[58] Field of Search ................... 455/38.1, 38.2, 455/38.4, 38.5, 32.1, 31.3, 566, 575, 121, 145, 149, 154.1, 156.2, 157.2; 340/311.1, 825.44, 825.47; 345/141, 142, 143, 128, 129, 130

[56] References Cited

U.S. PATENT DOCUMENTS

| | | | |
|---|---|---|---|
| H1173 | 4/1993 | Davis et al. | 455/38.1 |
| 4,975,694 | 12/1990 | McLaughlin et al. | 340/311.1 |
| 5,107,259 | 4/1992 | Weitzen et al. | 340/825.44 |
| 5,332,994 | 7/1994 | Kawashima et al. | 340/825.44 |
| 5,629,688 | 5/1997 | Muramatsu et al. | 340/825.44 |

FOREIGN PATENT DOCUMENTS 0 342 638 11/1989 European Pat. Off. .
WO 90/16052 12/1990 WIPO .

OTHER PUBLICATIONS

W. J. Kuznicki, "Visual Persuasion Display Pager", pp. 116–117, Motorola Technical Developments, vol. 13, Jul. 1, 1991.

Primary Examiner—Reinhard J. Eisenzopf
Assistant Examiner—Doris To
Attorney, Agent, or Firm—Young & Thompson

[57] ABSTRACT

A selective calling receiver previously stores a predetermined number of calling numbers and selectively receives a message according to one of the calling numbers. The received message and its corresponding calling number are sequentially stored onto a message memory. A font data memory stores a plurality of message fonts each corresponding to a different calling number group. In the font data memory, the calling numbers are divided into a plurality of caller groups each consisting of at least one calling number. In response to the user's instruction, the font data memory is searched for a message font based on the corresponding calling number to display the message with the message font on a display.

9 Claims, 4 Drawing Sheets

SELECTIVE CALL RECEIVER USING TYPEFACE-BASED SOURCE IDENTIFICATION

BACKGROUND OF THE INVENTION

1. Field of the Invention

The present invention generally relates to a mobile radio apparatus having a display and, in particular, to a selective call receiver which is capable of receiving a plurality of messages each following a different calling number and of displaying each message on screen.

2. Description of the Related Art

A selective call receiver has been widely used for various purposes and, especially, a small-sized and lightweight selective call receiver, or a pager, is suitable for being taken on the road. A basic function of the selective call receiver is to indicate by beep sound, vibration, or light the incoming call and then to inform the user of a received message, for example, displaying the received message on a liquid-crystal display (LCD) according to user's key operations.

Recently, there has been proposed a selective call receiver which is capable of receiving a plurality of messages each following a different calling number to display each message on screen. The respective calling numbers are previously assigned to predetermined callers or groups and are stored in the selective call receiver.

However, in cases of displaying a plurality of messages each received from a different caller or group, each message and its calling number are displayed on screen with characters in the same type font. Therefore, the user must recognize a caller by reading the calling number displayed on LCD screen, which makes determination of the identity of callers to be difficult.

SUMMARY OF THE INVENTION

An object of the present invention is to provide a selective call receiver which enable its user to easily recognize a plurality of callers.

According to the present invention, a selective call receiver is designed to display a received message with a different type font which is predetermined for each caller.

According to an aspect of the present invention, the selective call receiver selectively receives a first message from a first caller according to a first caller identifier and selectively receiving a second message from a second caller according to a second caller identifier. The first message associated with the first caller identifier and the second message associated with the second caller identifier are stored in a message memory. The selective calling receiver is further provided with a font data memory which stores a plurality of message fonts each corresponding to a different caller identifier. In response to the user's instruction, a first message font is selected from the font data memory according to the first caller identifier and then the first message is displayed on screen with the first message font. Further, in response to the user's instruction, a second message font is selected according to the second caller identifier and then the second message is displayed with the second message font.

According to another aspect of the present invention, a predetermined number of calling numbers are previously stored and, according to one of the calling numbers, a message is selectively received. The received message and its corresponding calling number are sequentially stored into a message memory. A font data memory stores a plurality of message fonts each corresponding to a different caller group.

The predetermined number of calling numbers are divided into a plurality of caller groups each consisting of at least one calling number. In response to the user's instruction, the font data memory is searched for a message font based on the corresponding calling number to display the message with the message font on the display.

The font data memory may store a plurality of message fonts each corresponding to a different calling number which is previously assigned to each caller. Preferably, the font data memory stores a plurality of message fonts each corresponding to a different caller group which consists of one or more calling numbers. Since a plurality of calling numbers are divided into a smaller number of caller groups, less memory capacity of the font data memory is needed.

According to the present invention, since a different font type is set for each caller or caller group, the user can easily identify its caller or caller group by only looking at the font type of a message on screen.

DETAILED DESCRIPTION OF THE PREFERRED EMBODIMENTS

Figure 1:
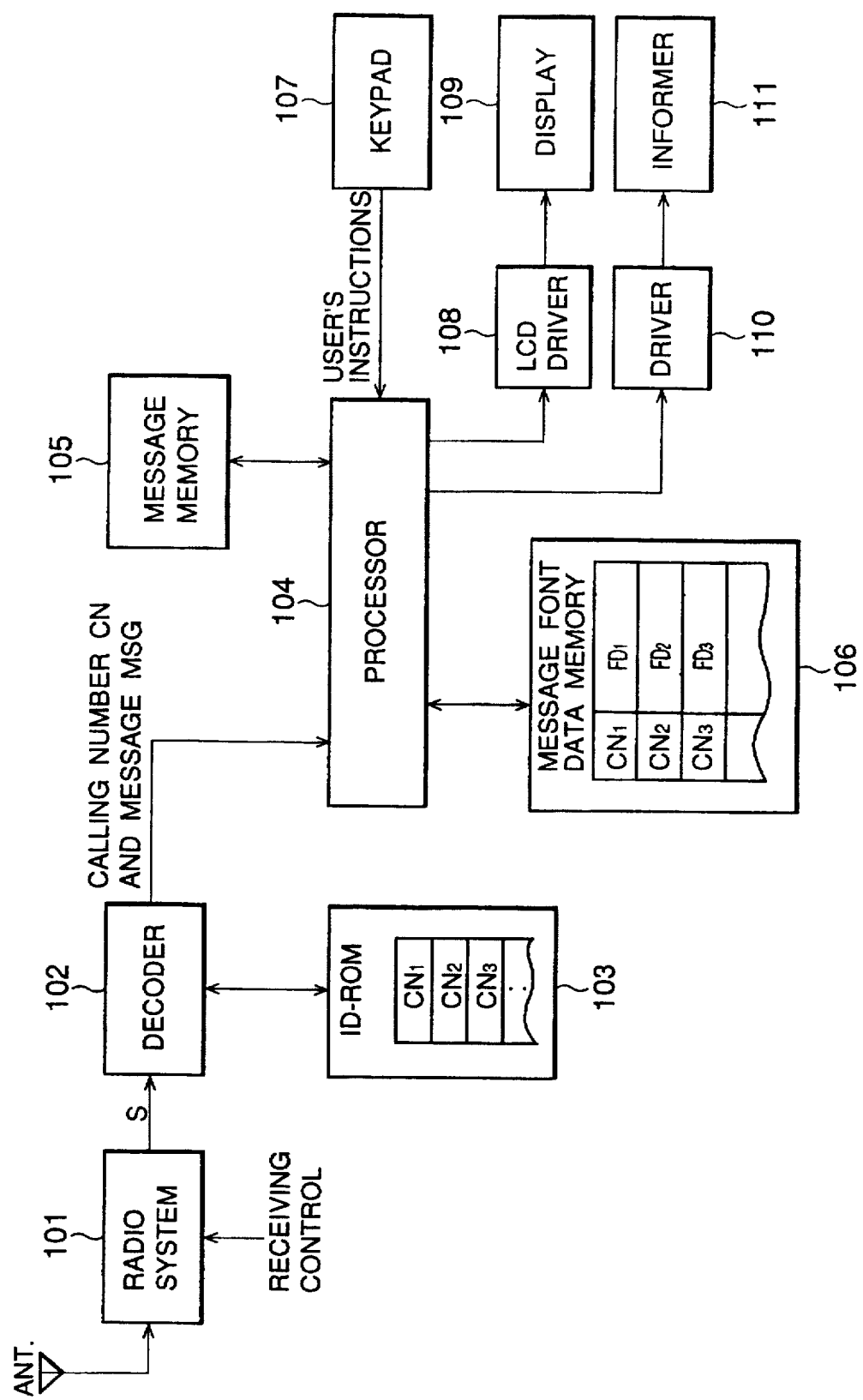
FIG. 1 is a block diagram showing a radio selective call receiver according to an embodiment of the present invention.

Referring to FIG. 1, there is shown a selective call receiver in accordance with the present invention. An antenna is connected to a radio system 101 which receives a radio selective calling signal from a radio base station (not shown) through the antenna and demodulates it into a baseband selective calling signal S.

The selective call receiver is provided with a decoder 102 and a calling number memory (ID-ROM) 103. The ID-ROM 103 stores a plurality of calling numbers, $CN_1$, $CN_2$, $CN_3$, . . . , which are previously assigned to predetermined callers, respectively. The decoder 102 decodes the selective calling signal S into received data and compares a selective calling number included in the received data with the predetermined calling numbers stored in the ID-ROM 103. when the received calling number is identical to one of the stored calling numbers, the received calling number $CN_i$ and a received message $MSG_i$, following the received calling number of the received data are transferred from the decoder 102 to a message memory 105 by a processor 104. In this manner, a plurality of received calling numbers and its received messages are sequentially stored in the message memory 105.

The selective call receiver is further provided with a message font data memory 106 which stores different font data $FD_i$ corresponding to each calling number $CN_i$. The processor 104 is capable of searching the message font data memory 106 based on a received calling number $CN_i$ and its received message $MSG_i$. As described later, when a received message is displayed, the processor 104 selects message font data $FD_{ij}$ from the message font data memory 106 depending on the calling number $CN_i$ and the received message $MSG_i$ stored in the message memory 105.

The processor 104 is connected to a keypad 107, a LCD driver 108 which is further connected to a liquid-crystal display (LCD) 109, a driver 110 which is further connected to an informer 111 such as a speaker 16 or a vibrator, and other necessary circuits including a power supply circuit. The keypad 107 includes a power switch and other function keys for inputting user's instructions. The processor 104 performs predetermined control operations including an intermittent ON/OFF receiving control and a message receiving control according to the operating program stored in a read-only memory (not shown). When an incoming call occurs, the processor 104 controls the driver 110 such that the informer 111 is activated. Further, when receiving a message displaying instruction from the keypad 107, the processor 104 reads the received calling number and the received message from the message memory 105 and selects the corresponding message font data from the message font data memory 106 to display it with a unique font type on the display 109.

Figure 2:
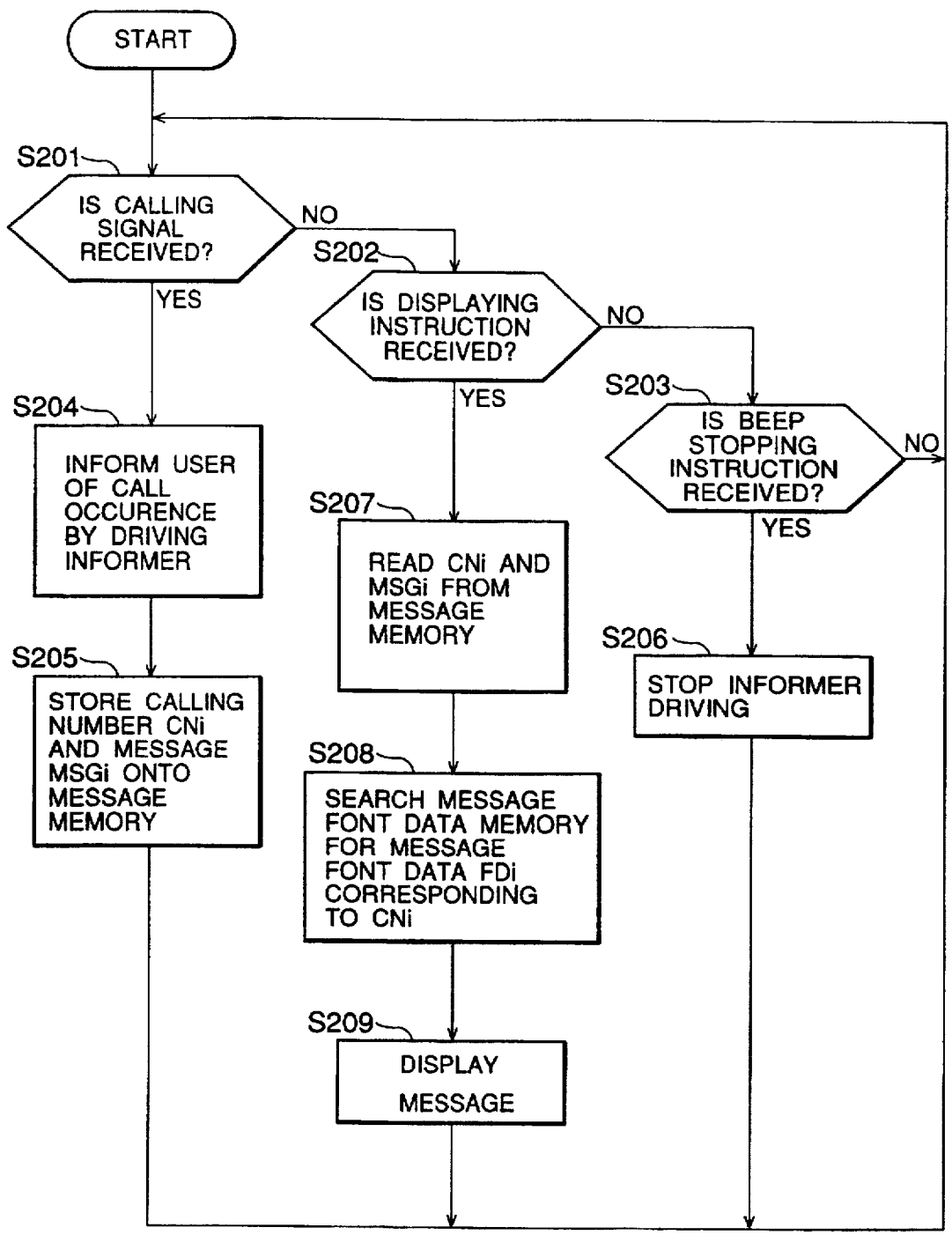
FIG. 2 is a flowchart showing an operation of the embodiment of FIG. 1.

As shown in FIG. 2, when power is turned on, the processor 104 starts the receiver operations that is, checks whether a calling signal is received (step S201), a message displaying instruction is received (step S202), or a beep stopping instruction is received (stepS203). When an incoming call occurs (YES in step S201), the processor 104 controls the LCD driver 108 and the informer driver 110 such that the informer 111 makes a beep to inform the user of the incoming call (step S202) and then the received calling number $CN_i$ and the received message $MSG_i$ are stored onto the message memory 105 (step S203). Therefore, each time incoming call occurs, a received calling number and its received message are sequentially stored onto the message memory 105.

Subsequently, when the user depresses a stop key for stopping the beep sound (YES in step S203), the processor 104 stops the informer driver 110 operating (step S206).

Further, when the user depresses a display key for displaying the received message on screen (YES in step S202), the processor 104 reads the received calling number $CN_i$ and the received message $MSG_i$ from the message memory 105 (step S207). Using the received calling number $CN_i$ and the received message $MSG_i$, as search specifications, the processor 104 performs font data searches from the received calling number $CN_i$ and the received message $MSG_i$, (step S208). The selected message font data $FD_{ij}$ is transferred to the LCD driver 108 and the received message is displayed with characters in a specified font type on the LDC 109 (step S209).

Taking the case of three calling numbers $CN_1$, $CN_2$ and $CN_3$ being previously set as an example, the message displaying operation will be described hereinafter. In this case, three font types: Gothic, large Roman, and Roman, corresponding to the respective calling numbers: $CN_1$, $CN_2$ and $CN_3$, are previously stored in the message font data memory 106.

Figure 3A:
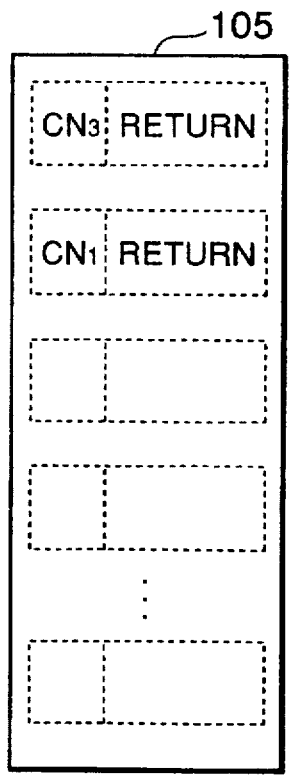
FIG. 3A is a schematic diagram showing an example of the contents of the message memory as shown in FIG. 1.
Figure 3B:
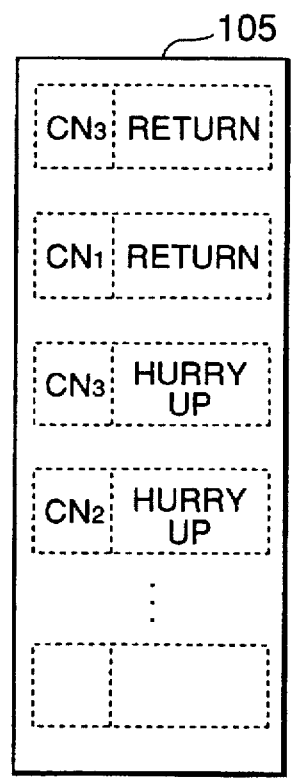
FIG. 3B is a schematic diagram showing another example of the contents of the message memory as shown in FIG. 1.

As shown in FIG. 3A, in the case where a message $MSG_3$, "RETURN" is received in the calling number $CN_3$ and then a message $MSG_1$ "RETURN" is received in the calling number $CN_1$, the message memory 105 stores the message $MSG_3$, "RETURN" associated with the calling number $CN_3$ and the message $MSG_1$, "RETURN" associated with the calling number $CN_1$. After that, when a message $MSG_3$ "HURRY UP" is further received in the calling number $CN_3$ and then a message $MSG_2$ "HURRY UP" is received in the calling number $CN_2$, the message memory 105, as shown in FIG. 3B, further stores the message $MSG_3$ "HURRY UP" associated with the calling number $CN_3$, and the message $MSG_2$ "HURRY UP" associated with the calling number $CN_2$.

Figure 4:
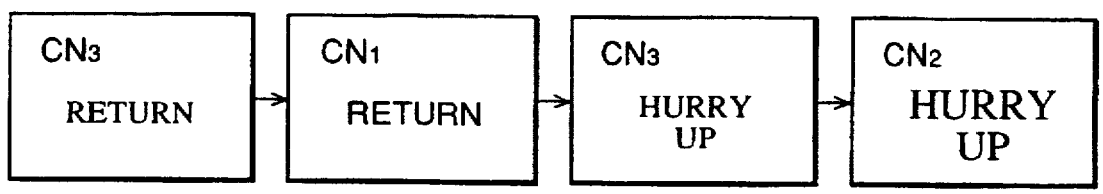
FIG. 4 is a diagram showing a sequence of messages displayed on LCD according to the embodiment.

As shown in FIG. 4, when the user pushes the display key of the keypad 107 for the first time, the processor 104 reads the first message data, that is, the received calling number $CN_3$, and the message $MSG_3$ "RETURN" from the message memory 105 and selects the corresponding message font data from the message font data memory 106 to display "RETURN" with Roman font type on the display 109.

Similarly, when the user pushes the display key of the keypad 107 one more time, the processor 104 reads the second message data, that is, the received calling number $CN_1$, and the message $MSG_1$ "RETURN" from the message memory 105 and selects the corresponding message font data from the message font data memory 106 to display "RETURN" with Gothic font type on the display 109. When the user pushes the display key of the keypad 107 a third time, the processor 104 reads the received calling number $CN_3$ and the message $MSG_3$, "HURRY UP" and selects the corresponding message font data to display "HURRY UP" with Roman font type on the display 109. When the user pushes the display key of the keypad 107 a fourth time, the processor 104 reads the received calling number $CN_2$ and the message $MSG_2$ "HURRY UP" and selects the corresponding message font data to display "HURRY UP" with large Roman font type on the display 109.

In this manner, the user can easily know who is calling by looking at the font type of a message on LCD 109. Needless to say, the respective font types of calling numbers are freely selected and stored in the message font data memory 106.

It is also preferable that the calling numbers are divided into two or more groups and a different font type is assigned to each group.

Figure 5:
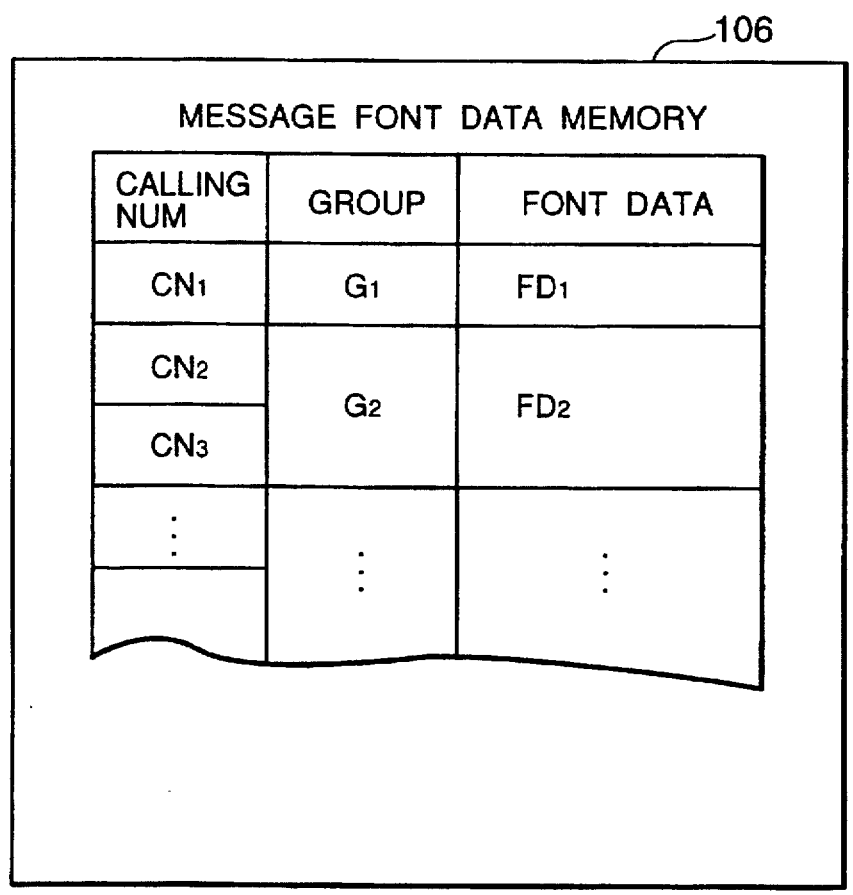
FIG. 5 is a Schematic diagram showing an example of the contents of the message font data memory of a selective calling receiver according to another embodiment of the present invention.

As shown in FIG. 5, a calling number $CN_1$, belongs to a first group $G_1$, and the following two calling numbers $CN_2$ and $CN_3$ belong to a second group $G_2$. That is, the message font data memory 106 stores message font data $FD_i$ corresponding to each group $G_i$. More specifically, the processor 104 decides on which group a received calling number $CN_i$ belongs to and then searches for the message font data $FD_j$ corresponding to the group $G_j$. In this case, less memory capacity for storing the font data is needed. For example, in the case where the calling numbers are divided into family and office groups, the family group may use Roman font type and the office group may use Gothic font type.

What is claimed is:

1. A selective calling receiver comprising:

a display;

input means for inputting a user's instruction;

receiving means for selectively receiving a first message from a first caller according to a first caller identifier and selectively receiving a second message from a second caller according to a second caller identifier;

message storage means for storing the first message associated with the first caller identifier and the second message associated with the second caller identifier;

font storage means for storing a plurality of message fonts each corresponding to a different caller identifier group which consists of at least one caller identifier; and control means in response to the user's instruction, for selecting a first message font according to the first caller identifier and the first message to display the first message with the first message font and selecting a second message font according to the second caller identifier and the second message to display the second message with the second message font.

2. A selective calling receiver comprising:

a display;

input means for inputting a user's instruction;

first storage means for storing a predetermined number of calling numbers;

receiving means for selectively receiving a message according to a calling number;

second storage means for storing the message and the calling number;

third storage means for storing a plurality of message fonts each corresponding to a different caller group, the predetermined number of calling numbers being divided into a plurality of caller groups each consisting of at least one calling number; and control means in response to the user's instruction, for searching the third storage means for a message font based on the calling number to display the message with the message font on the display.

3. The selective call receiver according to claim 2, wherein each of the caller groups consists of a single calling number.

4. The selective call receiver according to claim 2, wherein each of the caller groups consists of a plurality of calling numbers.

5. A method for displaying a received message on a display according to a user's instruction in a selective calling receiver, comprising the steps of:

selectively receiving a plurality of received messages according to a plurality of calling numbers;

storing the received messages associated with the calling numbers, respectively;

dividing the calling numbers into a plurality of calling groups each consisting of at least one calling number;

storing a plurality of message fonts each corresponding to a different calling group;

reading a message associated with a calling number in response to the user's instruction;

selecting a message font from the message fonts stored according to the calling number; and displaying the message with the message font selected.

6. A selective calling receiver comprising:

a display;

input means for inputting a user's instruction;

receiving means for selectively receiving a first message from a first caller according to a first caller identifier and selectively receiving a second message from a second caller according to a second caller identifier;

message storage means for storing the first message associated with the first caller identifier and the second message associated with the second caller identifier;

font storage means for storing a plurality of message fonts each corresponding to a different caller identifier; and control means in response to the user's instruction, for selecting a first message font according to the first caller identifier and the first message to display the first message with the first message font and selecting a second message font according to the second caller identifier and the second message to display the second message with the second message font;

wherein the control means sequentially reads a message associated with a caller identifier from the message storage means and searches the font storage means for a message font based on the caller identifier read from the message storage means.

7. A selective calling receiver comprising:

a display;

input means for entering commands;

receiving means for selectively receiving messages left by placing calls to any of a plurality of recognized calling numbers, each of the calling numbers being associated with a separate, predetermined calling number identifier;

message storage means for storing each of the received messages together with the predetermined calling number identifier associated with that message;

font storage means for storing a plurality of distinct message fonts, each of the message fonts being associated with one of the calling number identifiers; and control means for receiving commands through the input means to selectively display the received messages, each of the displayed received messages being displayed using the message font associated with the calling number identifier stored with the displayed received message.

8. The selective calling receiver of claim 7, wherein there are at least three of the distinct message fonts.

9. A selective calling receiver comprising:

a display;

input means for entering commands;

receiving means for selectively receiving messages left by placing calls to any of a plurality of recognized calling numbers, each of the calling numbers being associated with a separate, predetermined calling number identifier;

message storage means for storing each of the received messages together with the predetermined calling number identifier associated with that message;

font storage means for storing a plurality of distinct message fonts, each of the message fonts being associated with a group of the calling number identifiers; and control means for receiving commands through the input means to selectively display the received messages, each of the displayed received messages being displayed using the message font associated with the group of calling number identifiers which includes the calling number identifier stored with the displayed received message.

* * * * *